(12) United States Patent
Morgan et al.

(10) Patent No.: US 10,907,576 B2
(45) Date of Patent: Feb. 2, 2021

(54) THRUST REVERSER TERTIARY LOCKING SYSTEM

(71) Applicant: Goodrich Actuation Systems Limited, Solihull (GB)

(72) Inventors: Antony Morgan, Wolverhampton (GB); Michael Paul Somerfield, Stoke-on-Trent (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 313 days.

(21) Appl. No.: 15/964,118

(22) Filed: Apr. 27, 2018

(65) Prior Publication Data

US 2018/0334994 A1    Nov. 22, 2018

(30) Foreign Application Priority Data

May 22, 2017 (EP) .................................... 17275073

(51) Int. Cl.
*F02K 1/76* (2006.01)
*F01D 21/04* (2006.01)

(52) U.S. Cl.
CPC ............ *F02K 1/766* (2013.01); *F01D 21/045* (2013.01); *F05D 2220/323* (2013.01); *F05D 2240/14* (2013.01); *F05D 2240/60* (2013.01); *F05D 2260/4031* (2013.01)

(58) Field of Classification Search
CPC ......... F02K 1/763; F02K 1/766; F01D 25/045
See application file for complete search history.

(56) References Cited

U.S. PATENT DOCUMENTS

| 6,625,972 | B1* | 9/2003 | Sternberger | ............... F02K 1/76 239/265.29 |
| 8,443,585 | B2* | 5/2013 | Stern | .......................... F02K 1/09 60/226.2 |
| 8,692,489 | B2 | 4/2014 | Maalioune | |
| 9,422,888 | B2 | 8/2016 | Werquin et al. | |
| 2014/0230584 | A1* | 8/2014 | Hudson | ................... F16H 19/02 74/89.23 |
| 2014/0245716 | A1 | 9/2014 | Gonidec | |
| 2018/0274485 | A1* | 9/2018 | Gormley | ................. F02K 1/763 |

FOREIGN PATENT DOCUMENTS

EP     1286037 A1     2/2003
EP     1286937 A1     2/2003

OTHER PUBLICATIONS

Extended European Search Report for International Application No. 17275073.9 dated Nov. 30, 3017, 7 pages.

* cited by examiner

*Primary Examiner* — Andrew H Nguyen
(74) *Attorney, Agent, or Firm* — Cantor Colburn LLP

(57) ABSTRACT

A nacelle for a gas turbine engine, comprising a thrust reverser movable between a stowed position and a deployed position, and a locking system configured to selectively prevent movement of the thrust reverser from the stowed position, the locking system comprising a locking mechanism and an actuator configured to actuate the locking mechanism, wherein the locking mechanism is positioned aft of a blade-off zone defined across the nacelle and the actuator is positioned fore of, or at least partially within, the blade-off zone.

15 Claims, 2 Drawing Sheets

THRUST REVERSER TERTIARY LOCKING SYSTEM

FOREIGN PRIORITY

This application claims priority to European Patent Application No. 17275073.9 filed May 22, 2017, the entire contents of which is incorporated herein by reference.

TECHNICAL FIELD

The present disclosure relates generally to locking systems, and in particular to tertiary locking systems for aircraft thrust reversers.

BACKGROUND

Thrust reversers are provided on gas turbine engines typically to increase the amount of braking applied when landing an aircraft. When deployed, a thrust reverser will redirect some or all of the thrust to slow the aircraft.

There are a number of types of thrust reverser, all of which must be stowed during normal aircraft operation, for example so that the thrust reverser cannot be deployed during take-off or at a cruise altitude and can only be deployed during landing. To ensure this, one or more lock members are provided to prevent unwanted deployment of the thrust reverser.

Turbine engine thrust reverser systems typically comprise a nacelle including a thrust reverser translatable forward and aft on a translating sleeve. Most thrust reverser systems include primary, secondary and tertiary locking systems. Although this may depend on the particular configuration, the primary locking systems are typically coupled to the actuators of the thrust reverser, the secondary locking system may be coupled to the power drive unit of the actuators and the tertiary locking system may be coupled directly to a thrust reverser component (e.g., the translating sleeve).

Tertiary locking systems are typically designed such that an event that could corrupt the primary and secondary locking systems, such as a compressor or turbine blade-off, could not also disengage the tertiary locking system. The tertiary lock system must therefore be positioned outside of the blade-off zone.

However, it is desirable to minimise the axial and radial dimensions of the nacelle, and the need to position the tertiary locking system outside the blade-off zone may significantly limit any potential reduction in nacelle size.

It is therefore desirable to configure a tertiary locking system mountable in a restricted space envelope.

SUMMARY

According to one embodiment of the present disclosure, there is provided a nacelle for a gas turbine engine. The nacelle comprises a thrust reverser movable between a stowed position and a deployed position, and a locking system configured to selectively prevent movement of the thrust reverser from the stowed position. The locking system comprises a locking mechanism and an actuator configured to actuate the locking mechanism. The locking mechanism is positioned aft of a blade-off zone defined across the nacelle, and the actuator is positioned fore of, or at least partially within, the blade-off zone.

The locking system may be a tertiary locking system.

The actuator may be engaged with the locking mechanism via a transmission shaft.

The transmission shaft may be positioned at least partially within the blade-off zone.

The transmission shaft may be in communication with the locking mechanism via a speed change mechanism.

The speed change mechanism may be positioned aft of, or at least partially within, the blade-off zone.

The speed change mechanism may be configured to gear down the rotation of the transmission shaft.

The speed change mechanism may have a gear ratio of at least 3:1, for example between 3:1 and 12:1, or at least 4:1, for example between 4:1 and 10:1, or at least 6:1, for example between 6:1 and 8:1.

The locking mechanism may comprise a shoot bolt and a spring biasing the shoot bolt into a locked position to prevent movement of the thrust reverser from the stowed position.

The locking system may comprise a rotary-linear drive in communication with the locking mechanism. The rotary-linear drive may be configured to retract the shoot bolt into an unlocked position to allow movement of the thrust reverser from the stowed position when actuated.

The nacelle may define an internal cavity having a depth in the radial dimension that is reduced in the aft direction. The locking mechanism may be positioned in the nacelle at an axial position where the internal cavity has a maximum depth that is less than the maximum radial dimension of the actuator.

The internal cavity at the blade-off zone may have a larger depth than the radial dimension of the locking mechanism.

The blade off-zone may be a compressor blade-off zone.

The thrust reverser may be a cascade type thrust reverser.

There is further provided a gas turbine engine assembly comprising a gas turbine engine, the gas turbine engine comprising a compressor section and a turbine section, and a nacelle, as described above in any embodiment, surrounding the gas turbine engine. The compressor section or the turbine section comprises a plurality of stages that define the blade-off zone extending substantially radially from the compressor section or the turbine section and across the nacelle.

The blade-off zone may extend substantially radially away from a compressor section or a turbine section. The skilled person would be able to determine the location of the blade-off zone across a nacelle. In one example, the blade-off zone may extend in a 5° cone from a particular rotor stage of the compressor or turbine section in question. The total blade-off zone may thus extend at a 5° angle forward of a first rotor stage and at a 5° angle aft of a final rotor stage. In another example, the blade-off zone may extend in a 15° cone. The blade-off zone may be defined by a compressor, for example a high pressure compressor. In an alternative embodiment, the blade-off zone may be defined by a turbine, for example a high pressure turbine.

Separation of the actuator from the locking mechanism provides the advantage of the locking system being mountable within a smaller space envelope without needing to position the locking mechanism in a blade-off region. This allows nacelle dimensions to be reduced, particularly in the aft direction.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
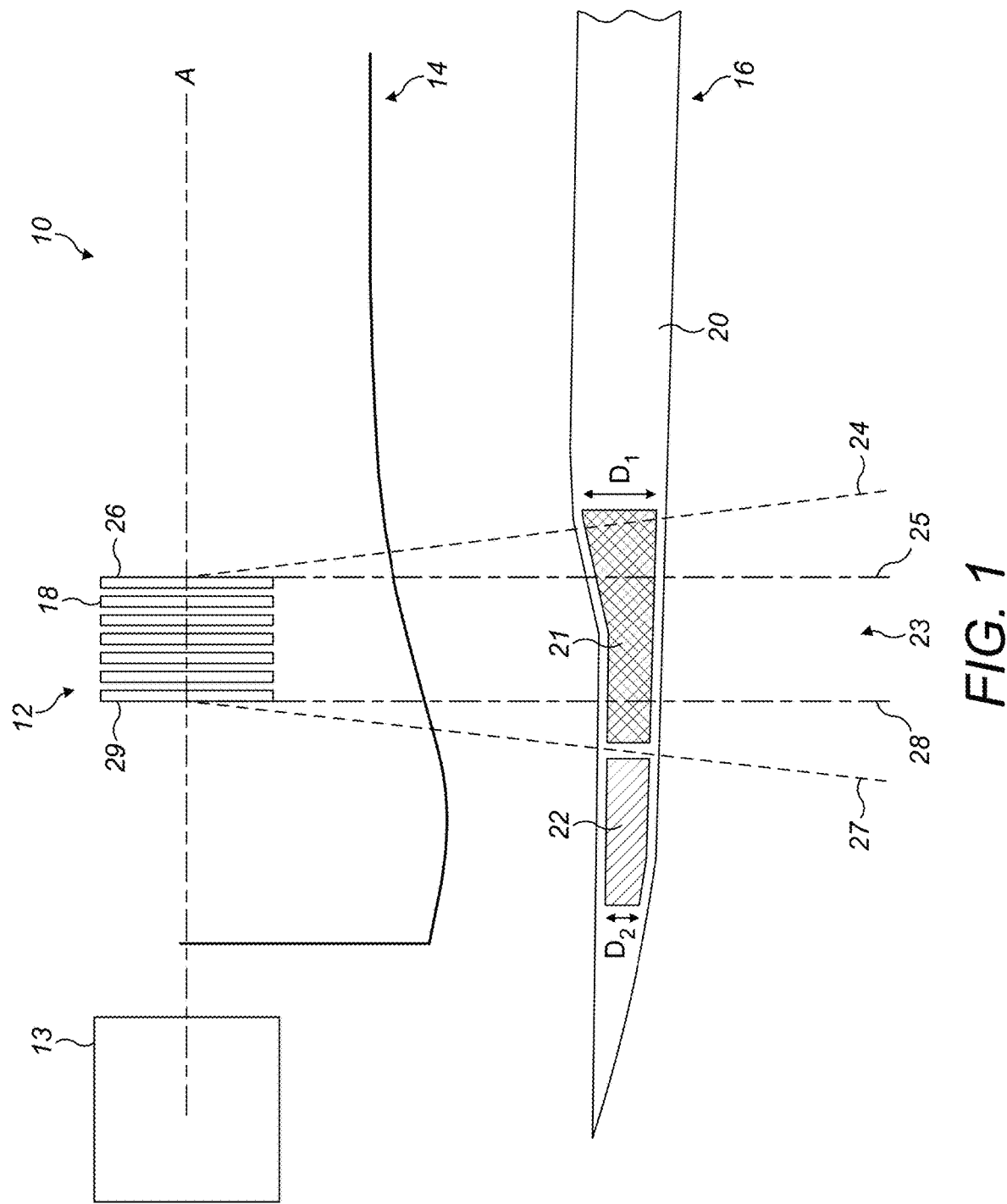
FIG. 1 shows a schematic cross-sectional view of portions of an exemplary nacelle and gas turbine engine.

FIG. 1 shows an example gas turbine engine 10 defining an engine axis A. The gas turbine engine 10 comprises a compressor section 12, a turbine section 13 and a core casing 14, and is surrounded by a nacelle 16. The compressor section 12 is a high pressure compressor section and comprises a plurality of compressor stages 18, each comprising a plurality of circumferentially arranged blades (the stator stages between the blades are not shown).

The compressor stages 18 define a compressor blade-off zone 23 extending substantially radially away from the compressor section 12 and into the nacelle 16. In one embodiment, a forward boundary 24 of the compressor blade-off zone 23 may extend up to 15° forward of a centreline 25 of the forward-most compressor stage 26 of the compressor section 12, and an aft boundary 27 of the compressor blade-off zone 23 may extend up to 15° aft of a centreline 28 of an aft-most compressor stage 29 of the compressor section 12. In other embodiments, the forward boundary 25 may extend up to 10° or up to 5° forward of the centreline 25 of the forward-most compressor stage 26, and the aft boundary 27 may extend up to 10° or up to 5° aft of the centreline 28 of the aft-most compressor stage 30.

The nacelle 16 defines an internal cavity 20 that has a depth in the radial dimension that is reduced in the aft direction. A first depth $D_1$ of a first portion 21 of the internal cavity 20 within, and forward of, the compressor blade-off zone 23 is larger than a second depth $D_2$ of a second portion 22 of the internal cavity 20 aft of the compressor blade-off zone 23.

Figure 2:
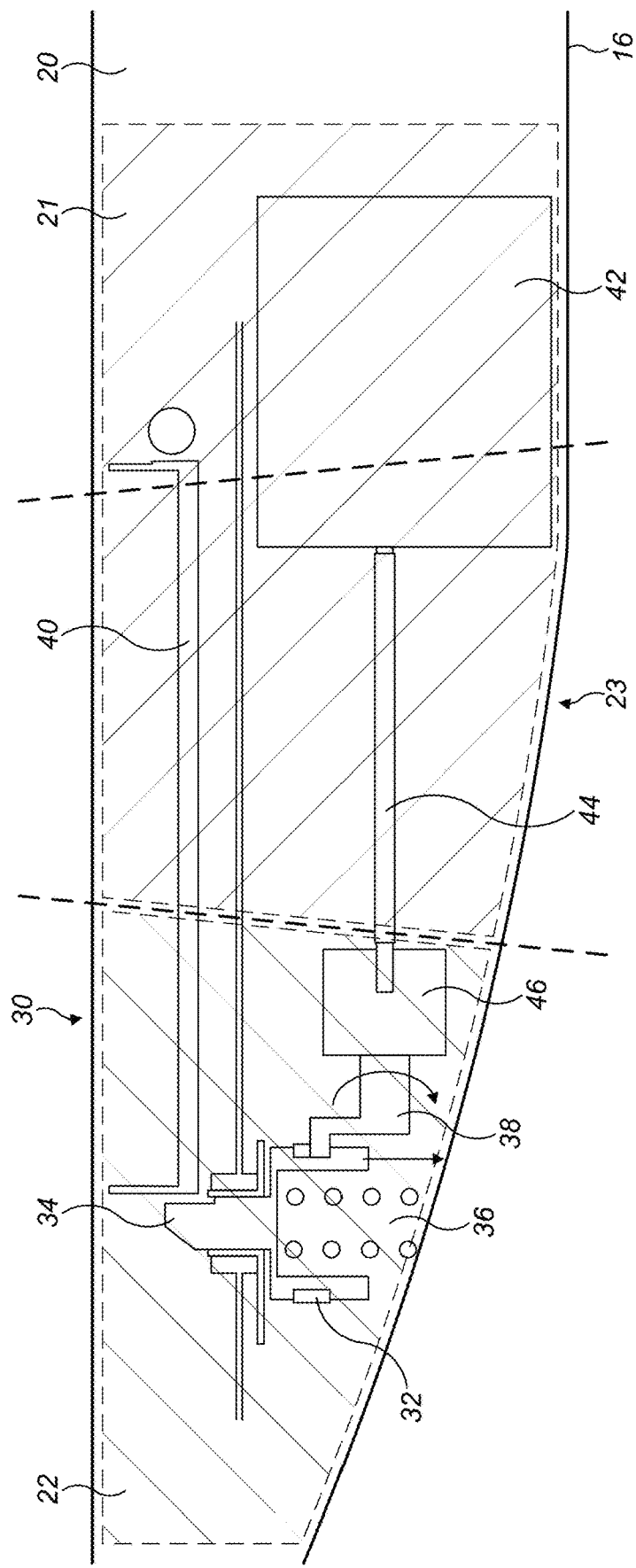
FIG. 2 shows a schematic cross-sectional view of an exemplary tertiary locking system.

FIG. 2 shows an example tertiary locking system 30 according to the present disclosure. The tertiary locking system 30 comprises a locking mechanism 32, also known as a track lock, positioned aft of the compressor blade-off zone 23 in the second portion 22 of the internal cavity 20. The locking mechanism 32 is configured to selectively prevent axial translation of a thrust reverser by selectively engaging a component of the thrust reverser, such as translating sleeve 40. The locking mechanism 32 is configured to prevent axial translation of the translating sleeve 40 when in a locked position, and is configured to allow axial translation of the translating sleeve 40 when in an unlocked position.

The locking mechanism 32 may be, for example, a shoot bolt assembly comprising a shoot bolt 34 and a spring 36. The spring 36 may bias the shoot bolt 34 in the locked position. A rotary-linear drive 38 may be in communication with the shoot bolt assembly and may be configured to retract the shoot bolt 34 into the unlocked position when actuated. In other embodiments the locking mechanism 32 may be a pivoting lock assembly, or another type of locking assembly.

The tertiary locking system 30 further comprises an actuator 42 configured to actuate the locking mechanism 32. The actuator 42 is wider in a radial dimension than the locking mechanism 32. The actuator 42 may be, for example, an electric motor. The actuator 42 may be positioned within, or forward of, the compressor blade-off zone 23 in the first portion 21 of the internal cavity 20. The maximum radial dimension of the actuator 42 may be larger than the maximum radial dimension of the second portion 22 of the internal cavity 20 aft of the compressor blade-off zone 23. The actuator 42 may be configured to actuate the locking mechanism 32 via the rotary-linear drive 38.

The tertiary locking system 30 may further comprise a transmission shaft 44. The transmission shaft 44 may engage the actuator 42 with the locking mechanism 32. The transmission shaft 44 may extend at least partially through the compressor blade-off zone 23.

The tertiary locking system 30 may further comprise a speed change mechanism 46. The speed change mechanism 46 may be positioned intermediate the transmission shaft 44 and the locking mechanism 32. The speed change mechanism 46 may be positioned intermediate the transmission shaft 44 and the rotary-linear drive 38. The speed change mechanism 46 may be positioned aft of, or at least partially within, the compressor blade-off zone 23. The speed change mechanism 46 may be configured to substantially gear down the rotation of the transmission shaft 44. In one embodiment, the speed change mechanism 46 has a gear ratio of at least 3:1, for example between 3:1 and 12:1. In another embodiment, the speed change mechanism 46 has a gear ratio of at least 4:1, for example between 4:1 and 10:1. In another embodiment, the speed change mechanism 46 has a gear ratio of at least 6:1, for example between 6:1 and 8:1.

Separation of the actuator 42 from the locking mechanism 32 provides the advantage of the tertiary locking system 30 being mountable within a smaller space envelope without needing to position the locking mechanism 32 in a blade-off region. This allows nacelle dimensions to be reduced.

Gearing down the transmission shaft 44 provides the advantage of preventing the thrust reverser from being accidentally deployed in the event of a compressor blade striking the transmission shaft 44, as the induced rotation of the transmission shaft 44 would not be sufficient to actuate the locking mechanism 32. Put another way, in order to unlock the locking mechanism 32 during normal operation, the actuator 42 needs to rotate the transmission shaft 44 a high number of times, so any inadvertent rotation of the transmission shaft 44 caused by a blade-off event would not be enough to unlock the locking mechanism 32. This allows the transmission shaft 44 to extend at least partially through the compressor blade-off zone 23.

Although the figures and the accompanying description describe particular embodiments and examples, it is to be understood that the scope of this disclosure is not to be limited to such specific embodiments, and is, instead, to be determined by the following claims.

The invention claimed is:

1. A nacelle for a gas turbine engine, comprising:
   a thrust reverser movable between a stowed position and a deployed position; and
   a locking system configured to selectively prevent movement of the thrust reverser from the stowed position, the locking system comprising a locking mechanism and an actuator configured to actuate the locking mechanism, wherein the locking mechanism is positioned aft of a blade-off zone defined across the nacelle and the actuator is positioned fore of, or at least partially within, the blade-off zone.

2. The nacelle of claim 1, wherein the actuator is engaged with the locking mechanism via a transmission shaft.

3. The nacelle of claim 2, wherein the transmission shaft is positioned at least partially within the blade-off zone.

4. The nacelle of claim 2, wherein the transmission shaft is in communication with the locking mechanism via a speed change mechanism.

5. The nacelle of claim 4, wherein the speed change mechanism is positioned aft of, or at least partially within, the blade-off zone.

6. The nacelle of claim 4, wherein the speed change mechanism is configured to gear down rotation of the transmission shaft.

7. The nacelle of claim 4, wherein the speed change mechanism has a gear ratio of at least 3:1, or at least 4:1, or at least 6:1.

8. The nacelle of claim 1, wherein the locking mechanism comprises a shoot bolt and a spring biasing the shoot bolt into a locked position to prevent movement of the thrust reverser from the stowed position.

9. The nacelle of claim 8, wherein the locking system further comprises a rotary-linear drive in communication with the locking mechanism, the rotary-linear drive configured to retract the shoot bolt into an unlocked position to allow movement of the thrust reverser from the stowed position when actuated.

10. The nacelle of claim 1, wherein the nacelle defines an internal cavity having a depth in a radial dimension that is reduced in the aft direction, and the locking mechanism is positioned in the nacelle at an axial position where the internal cavity has a maximum depth that is less than a maximum radial dimension of the actuator.

11. The nacelle of claim 10, wherein the internal cavity at the blade-off zone has a larger depth than the radial dimension of the locking mechanism.

12. The nacelle of claim 1, wherein the blade-off zone is a compressor blade-off zone.

13. The nacelle of claim 12, wherein the blade-off zone is a high pressure compressor blade-off zone.

14. A gas turbine engine assembly comprising:
  a gas turbine engine comprising a compressor section and a turbine section; and
  a nacelle surrounding the gas turbine engine, the nacelle including:
    a thrust reverser movable between a stowed position and a deployed position; and
    a locking system configured to selectively prevent movement of the thrust reverser from the stowed position, the locking system comprising a locking mechanism and an actuator configured to actuate the locking mechanism, wherein the locking mechanism is positioned aft of a blade-off zone defined across the nacelle and the actuator is positioned fore of, or at least partially within, the blade-off zone;
  wherein the compressor section or the turbine section comprises a plurality of stages that define the blade-off zone extending substantially radially from the compressor section or the turbine section and across the nacelle.

15. The gas turbine engine assembly of claim 14, wherein the compressor section is a high pressure compressor section and the blade-off zone extends substantially radially from the high pressure compressor section.

* * * * *